United States Patent
Clare et al.

(10) Patent No.: US 6,179,310 B1
(45) Date of Patent: Jan. 30, 2001

(54) VEHICLE ROLL STABILIZING SYSTEM

(75) Inventors: David Andrew Clare, Wellesbourne; Phillip James Green, Nuneaton; William Burdock, Sutton Coldfield; Mark Pask, Bromsgrove, all of (GB)

(73) Assignee: Rover Group Limited, Warwick (GB)

( * ) Notice: Under 35 U.S.C. 154(b), the term of this patent shall be extended for 0 days.

(21) Appl. No.: 09/319,494

(22) PCT Filed: Dec. 11, 1997

(86) PCT No.: PCT/GB97/03314

§ 371 Date: Jun. 7, 1999

§ 102(e) Date: Jun. 7, 1999

(87) PCT Pub. No.: WO98/26948

PCT Pub. Date: Jun. 25, 1998

(30) Foreign Application Priority Data

Dec. 14, 1996 (GB) .................................................. 9626045

(51) Int. Cl.⁷ .................................................... B60G 9/99
(52) U.S. Cl. ........................... 280/124.159; 280/124.106; 280/124.16; 280/5.506
(58) Field of Search ................. 280/5.5, 5.502, 280/5.506, 124.16, 124.106, 124.158, 124.159

(56) References Cited

U.S. PATENT DOCUMENTS

| | | | |
|---|---|---|---|
| 5,088,759 | * | 2/1992 | Takehara et al. ............. 280/124.106 |
| 5,141,245 | * | 8/1992 | Kamimura et al. ........... 280/124.106 |
| 5,144,559 | * | 9/1992 | Kamimura et al. ............ 364/424.05 |
| 5,161,822 | | 11/1992 | Lund . |
| 5,251,134 | * | 10/1993 | Takehara et al. ............... 364/424.05 |
| 5,251,136 | * | 10/1993 | Fukuyama ....................... 364/424.05 |
| 5,287,277 | * | 2/1994 | Mine et al. ...................... 364/424.05 |
| 5,481,459 | * | 1/1996 | Bungeler ......................... 364/424.05 |
| 5,505,480 | * | 4/1996 | Pascarella ............................. 280/5.5 |
| 5,515,274 | * | 5/1996 | Mine et al. ...................... 364/424.05 |
| 5,529,324 | * | 6/1996 | Krawczyk et al. ............ 280/124.106 |
| 5,630,623 | * | 5/1997 | Ganzel ........................... 280/124.106 |
| 5,987,366 | * | 11/1999 | Jun ......................................... 701/37 |

FOREIGN PATENT DOCUMENTS

| | | |
|---|---|---|
| 4326447 | 2/1995 | (DE) . |
| 0270327 | 6/1988 | (EP) . |
| 0508528 | 10/1992 | (EP) . |
| 0512358 | 11/1992 | (EP) . |

(List continued on next page.)

OTHER PUBLICATIONS

Patent Abstracts of Japan, vol. 010, No. 055 (M–458), Mar. 5, 1986 & JP 60 203516 A (Mazda KK), Oct. 15, 1985, see abstract: figures.

Patent Abstracts of Japan, vol. 015, No. 073 (M–1084), Feb. 20, 1991 & JP 02 296524 A (Nissan Motor Co. Ltd.), Dec. 7, 1990, see abstract; figures 3,4,8,9.

Patent Abstracts of Japan, vol. 015, No. 400 (M–1167), Oct. 11, 1991 & JP 03 164320 A (Mitsubishi Motors Corp), Jul. 16, 1991, see abstract.

(List continued on next page.)

*Primary Examiner*—Eric Culbreth
*Assistant Examiner*—L. Lum
(74) *Attorney, Agent, or Firm*—Davis and Bujold

(57) ABSTRACT

A vehicle roll stabilizing system uses front and rear stabilizer assemblies (23, 24) which each use a stabilizer bar (24) and a hydraulic ram (33, 35) to resist vehicle roll. Selector valves (43, 44) select pressure from a pump (36) or return hydraulic oil to a reservoir (37) according to 4 modes, two of which the selector valve is in an on and an off condition, respectively. A diverter valve (73) operates to control the pump pressure in proportion to lateral acceleration to provide an actuator effort which resists roll during vehicle cornering. This effort is provided up to a limit equivalent to a lateral acceleration of approximately 0.4 g after which roll is allowed to increase, either by keeping the pump pressure (and hence effort) constant or by increasing the pump pressure at a reduced rate.

17 Claims, 4 Drawing Sheets

FOREIGN PATENT DOCUMENTS

| | | |
|---|---|---|
| 0783986 | 7/1997 | (EP) . |
| 2006131 | 5/1979 | (GB) . |
| 2234946 | 2/1991 | (GB) . |
| 2235168 | 2/1991 | (GB) . |
| 2284184 | 5/1995 | (GB) . |
| 93/04884 A1 | 3/1993 | (WO) . |

OTHER PUBLICATIONS

Patent Abstracts of Japan, vol. 016, No. 576, (M–1345), Dec. 16, 1992 & JP 04 224412 A (Toyota Motor Corps; Others: 01), Aug. 13, 1992, see abstract; figures.

Patent Abstracts of Japan, vol. 011, No. 352 (M–643), Nov. 18, 1987 & JP 62 131811 A (Nippon Denso Co Ltd), Jun. 15, 1987, see abstract, figures 1,2.

Patent Abstracts of Japan, vol. 095, No. 007, Aug. 31, 1995 & JP 07 089319 A (Nissan Motor Co Ltd), Apr. 1995, see abstract; figures.

Patent Abstracts of Japan, vol. 014, No. 464 (M–1033), Oct. 9, 1990 & JP 02 185817 A (Nissan Motor Co Ltd.), Jul. 20, 1990, see abstract; figures.

Patent Abstracts of Japan, vol. 095, No. 011, Dec. 26, 1995 & JP 07 228124 A (Nissan Diesel Motor Co Ltd), Aug. 29, 1995, see abstract; figures 1, 4–7, 9.

* cited by examiner

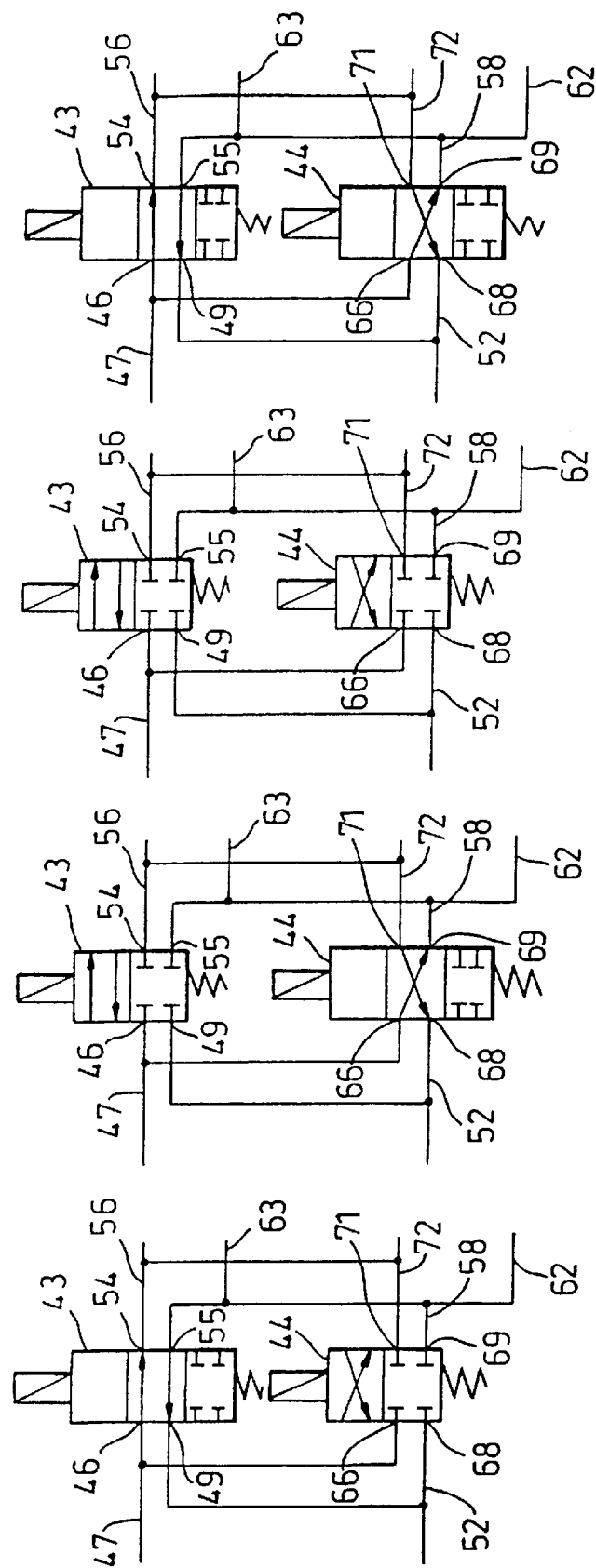

VEHICLE ROLL STABILIZING SYSTEM

BACKGROUND OF THE INVENTION

FIELD OF THE INVENTION

This invention relates to vehicle roll stabilising systems of the kind in which an actuator operatively connected to sprung and unsprung portions of the vehicle is arranged so that roll of the vehicle due to lateral acceleration of the vehicle tends to cause displacement of the actuator, the actuator is operable in use to exert an effort in opposition to such displacement and so counteract the roll. Such a system is known for example from WO-A-89/04262.

It is an object of the invention to provide an improved roll stabilising system for a vehicle.

SUMMARY OF THE INVENTION

According to one aspect of the invention there is provided a roll stabilising system for a vehicle having front and rear wheels, a front suspension resiliently supporting vehicle weight on the front wheels and a rear suspension resiliently supporting vehicle weight on the rear wheels, the stabilising system including an actuator operatively connected to sprung and unsprung portions of the vehicle and arranged so that roll of the vehicle due to lateral acceleration of the vehicle tends to cause displacement of the actuator, the actuator being operable in use to exert an effort in opposition to such displacement and so counteract the roll, the system further including electronic control means operatively connected to the actuator to control the actuator effort in response to the lateral acceleration such that the actuator effort generally increases with increasing lateral acceleration, the increase in actuator effort being at a rate which is variable according to the magnitude of the lateral acceleration.

Preferably the actuator effort increases in direct proportion to the vehicle lateral acceleration up to a predetermined magnitude of lateral acceleration, in which case the actuator effort can be substantially equal to that required to maintain the vehicle level during cornering. Beyond said predetermined magnitude, the actuator effort can remains constant when lateral acceleration is increased, i.e. the rate of increase of actuator effort with the lateral acceleration reduces to zero. However, in a preferred arrangement, the actuator effort continues to increase in direct proportion to the lateral acceleration but at a reduced rate. In this case the actuator effort may be arranged to remain constant when the lateral acceleration is increased beyond a second predetermined magnitude. The predetermined magnitude of lateral acceleration is typically in the range 0.3 to 0.6 g, e.g. around 0.5 g in the case where the actuator effort remains constant when lateral acceleration is increased and around 0.4 g in the case where the actuator effort continues to increase in direct proportion to lateral acceleration at the reduced rate. Where the actuator effort is arranged to remain constant when lateral acceleration is increased beyond a second predetermined magnitude, the second predetermined magnitude of lateral acceleration is typically 1.0 g.

There may be a first actuator associated with the front wheels and a second actuator associated with the rear wheels. This enhances the vehicle stability during cornering by keeping the proportional share of the vehicle weight carried by each of the front wheels substantially the same as that of each of the rear wheels.

Conveniently the or each actuator comprises a double acting hydraulic device having first and second inlet/outlet ports, valve means being provided for controlling flow of hydraulic fluid from a source of hydraulic pressure to a drain, the valve means being operable in a first mode in which the first inlet/outlet port is connected to the source and the second inlet/outlet port is connected to the drain and in a second mode in which the second inlet/outlet port is connected to the source and the first inlet/outlet port is connected to the drain, and pressure modulating means is provided to modulate the pressure of the hydraulic fluid supplied by the source to the valve means and thereby control the actuator effort. The first and second modes are the normal operating modes for the valve means when the stabilising system is active to reduce or prevent roll, the first and second modes being selected according to the direction of cornering.

Where there is a first actuator associated with the front wheels and a second actuator associated with the rear wheels, said valve means can be common to both actuators. This arrangement equalises the pressures at both actuators, thereby keeping the proportional share of the vehicle weight carried by each of the front wheels the same as that of each of the rear wheels, as discussed earlier.

If the flow rate of the hydraulic fluid supplied by the source is limited, the pressure modulating means may conveniently comprise a diverter valve which diverts some of the hydraulic fluid supplied by the source to the drain. The diverter valve may comprise an electrically driven proportional valve in which the restriction to hydraulic flow from the source to the drain varies proportionally with the driving electrical current.

Preferably, the valve means comprises first and second selector valves, each selector valve having a supply port for connection to the source, a return port for connection to the drain, a first control port connected to one of the inlet/outlet ports of the or each actuator and a second control port connected to the other of the inlet/outlet ports of the or each actuator, each selector valve having an off condition in which communication between the supply and drain ports and the control ports is prevented and an on condition in which, in the first selector valve, the supply port is connected to the first control port and the second control port is connected to the return port and, in the second selector valve, the supply port is connected to the second control port and the first control port is connected to the return port, the arrangement being such that, in the first mode, the first selector valve is in the on condition and the second selector valve is in the off condition and, in the second mode, the first selector valve is in the off condition and the second selector valve is in the on condition.

Such an arrangement of first and second selector valves can be used in other vehicle roll stabilising systems. Hence, according to a second aspect of the invention, there is provided a roll stabilising system for a vehicle having front and rear wheels, a front suspension resiliently supporting vehicle weight on the front wheels and a rear suspension resiliently supporting vehicle weight on the rear wheels, the stabilising system including an actuator operatively connected to sprung and unsprung portions of the vehicle and arranged so that roll of the vehicle tends to cause displacement of the actuator, the actuator comprising a double acting hydraulic device having first and second inlet/outlet ports and being operable in use to exert an effort in opposition to such displacement and so counteract the roll, the system further including valve means for controlling flow of hydraulic fluid from a source of hydraulic pressure to a drain, the valve means being operable in a first mode in which the first inlet/outlet port is connected to the source and the second inlet/outlet port is connected to the drain and in a second mode in which the second inlet/outlet port is connected to the source and the first inlet/outlet port is connected to the drain, and pressure modulating means to modulate the pressure of the hydraulic fluid supplied by the source to the valve means and thereby control the actuator effort, the valve means comprising first and second selector valves each having a supply port for connection to the source, a return port for connection to the drain, a first control port connected to one of the inlet/outlet ports of the actuator and a second control port connected to the other of the inlet/outlet ports of the actuator, each selector valve having an off condition in which communication between the supply and drain ports and the control ports is prevented and an on condition in which, in the first selector valve, the supply port is connected to the first control port and the second control port is connected to the return port and, in the second selector valve, the supply port is connected to the second control port and the first control port is connected to the return port, the arrangement being such that in the first mode the first selector valve is in the on condition and the second selector valve is in the off condition and in the second mode the first selector valve is in the off condition and the second selector valve is in the on condition. As described above in relation to the first aspect of the invention, where there is a first actuator associated with the front wheels and a second actuator associated with the rear wheels, said valve means can be common to both actuators.

Because each selector valve has only two operative states, each can be of relatively simple construction.

The valve means may be operable in a third mode in which the inlet/outlet ports are blocked and in a fourth mode in which the inlet/outlet ports are interconnected, the arrangement being such that, in the third mode, both selector valves are in the off condition and, in the fourth mode, both selector valves are in the on condition. When the valve means is in the third mode, the actuator can act as a direct mechanical interconnection (i.e. is locked solid) and the actuator is active to resist (but not necessarily prevent) roll. This mode is useful as a fail-safe mode under normal driving conditions on good roads. In the fourth mode of the valve means the actuator can be moved freely through the full extent of its operating travel. This is useful if the vehicle is operating under extreme off-road conditions since it provides the least resistance to articulation of the front and rear suspensions.

Preferably each selector valve is spring biased into the off condition. This is the condition for the third mode which can thereby be achieved in the absence of power to drive the selector valves.

Conveniently there is a restricted flow path between the inlet/outlet ports of the actuator. This is useful for the third mode condition of the valve means if there are unequal side to side deflections of the front and rear suspensions of the vehicle. The actuator can then effectively act as a dashpot to allow the front and rear suspensions to move the vehicle into an upright static position, the actuator being allowed to move to its mid position. Where the actuator includes an actuating piston the flow path may be through or past the piston.

The or each actuator may be associated with a respective stabiliser assembly comprising a stabiliser bar and the actuator, the or each stabiliser assembly having connections adjacent each end of the stabiliser bar to connect the stabiliser assembly to adjacent sprung and unsprung portions of the vehicle and arranged so that roll of the vehicle causes the connections to move in a manner tending to twist the stabiliser assembly and the actuator effort acting to resist such twist.

In a further aspect, the invention also comprises a vehicle incorporating a roll stabilising system according to any preceding aspect of the invention.

BRIEF DESCRIPTION OF THE DRAWINGS

A roll stabilising system according to the invention will now be described by way of example and with reference to the accompanying drawings, in which:

FIGS. 4 to 7 show part of the hydraulic circuit diagram shown in FIG. 1 in first, second, third and fourth operating modes respectively;

DESCRIPTION OF THE PREFERRED EMBODIMENTS

Figure 1:
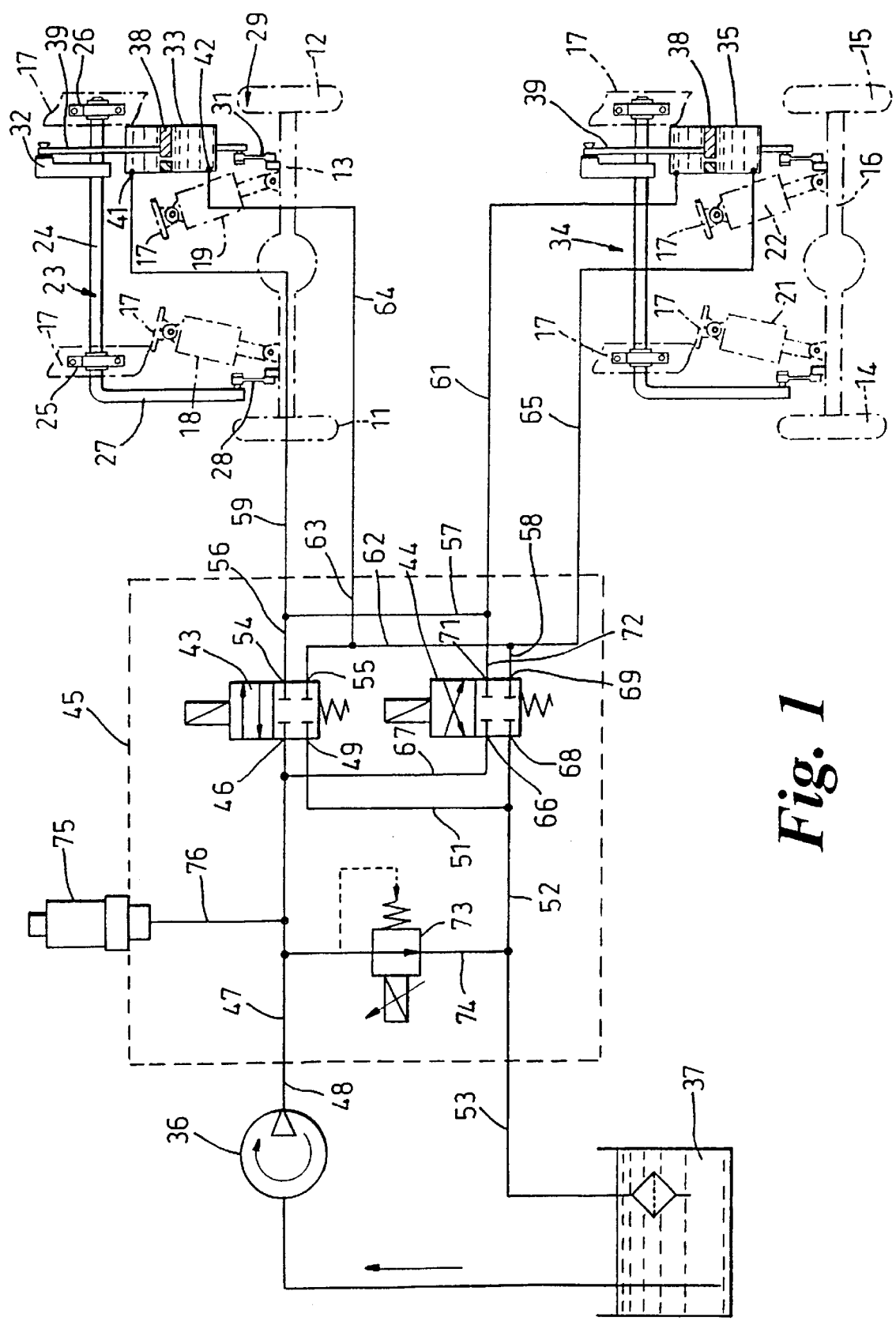
FIG. 1 is an hydraulic circuit diagram of a roll stabilising system according to the invention which also shows diagrammatically certain mechanical elements of the system.
Figure 2:
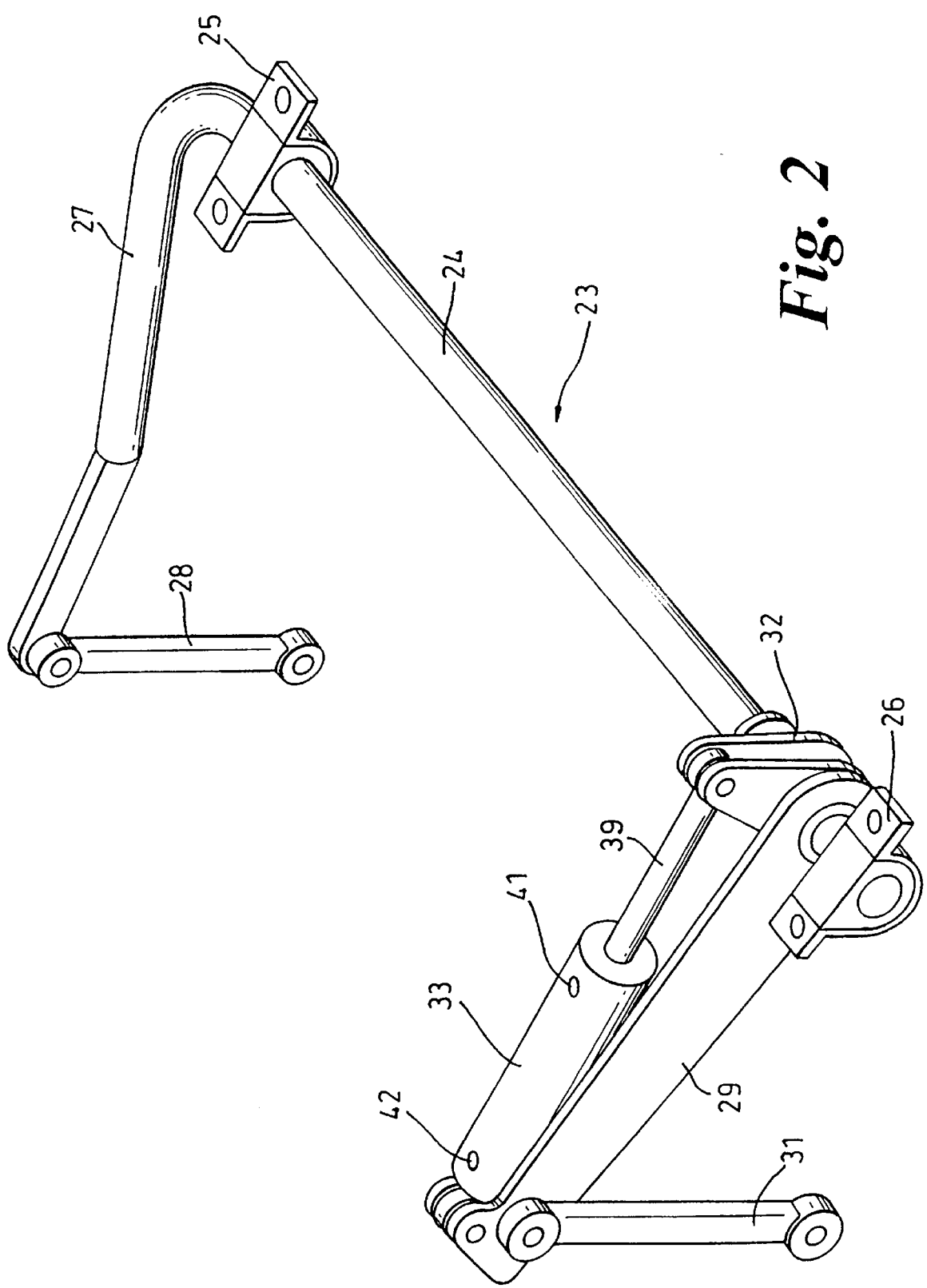
FIG. 2 is a perspective view of certain of the mechanical elements shown in FIG. 1.
Figure 3:
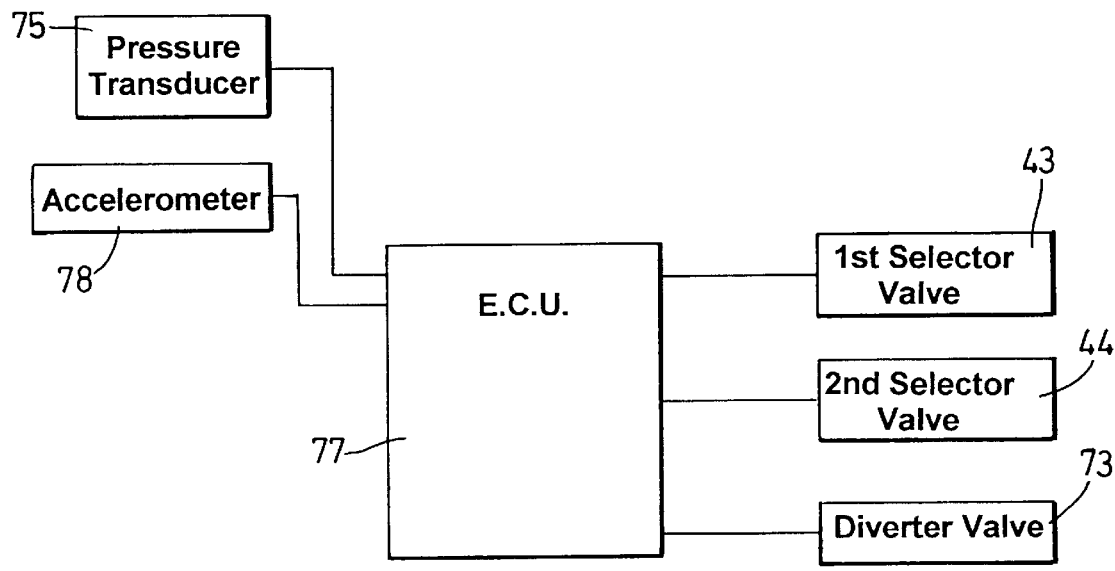
FIG. 3 is a block diagram showing an electronic control system used to control the hydraulic circuit shown in FIG. 1.

The roll stabilising system shown in FIGS. 1 to 7 is for a vehicle which has front wheels 11, 12 carried on a front axle 13 and rear wheels 14, 15 carried on a rear axle 16. The vehicle has a body which is carried on a chassis 17, the vehicle weight being resiliently supported by front suspension units 18, 19 and rear suspension units 21, 22.

A front stabiliser assembly 23 includes a stabiliser or anti-roll bar 24 connected to the vehicle chassis 17 by bearing assemblies 25, 26 laterally spaced towards each side of the vehicle. The front stabiliser bar 24 has an integral arm 27 which extends in a substantially horizontal direction longitudinally towards the rear of the vehicle. The end of the arm 27 remote from the left hand bearing assembly 25 is connected to the front axle 13 near the left hand wheel 11 by a pivotal link 28. At the other end of the stabiliser bar 24 to the arm 27, a pivot arm assembly 29 is pivoted on the stabiliser bar and carries another pivotal link 31 which connects it to the front axle 13 near to the right hand wheel 12. The chassis 17 is a sprung part of the vehicle whereas the front axle 13 is an unsprung part.

A crank arm 32 is securely fastened to the stabiliser bar 24 (e.g. by welding) and extends in a substantially vertical direction, i.e. at approximately right angles to the arm 27 and the pivot arm assembly 29. An actuator in the form of a double acting hydraulic ram 33 is pivotally connected to the crank arms 32 and to the pivot arm assembly 29 adjacent to the pivotal link 31.

A rear stabiliser assembly 34 is substantially identical to the front stabiliser assembly 23 and has its own hydraulic ram 35. The hydraulic rams 33, 35 are arranged to be connected to a source of hydraulic pressure in the form of an engine driven pump 36 or to a drain in the form of an hydraulic reservoir 37.

Each hydraulic ram 33, 35 has a piston 38 and an actuating rod 39. On the actuating rod side of the piston 38 there is a first inlet/outlet port 41 and on the other side of the piston there is a second inlet/outlet port 42. Valve means in the form of first and second solenoid-controlled selector valves 43 and 44 are provided to control the flow of hydraulic fluid from the pump 36 to the inlet/outlet ports 41 and 42 and to control the return flow from the inlet/outlet ports to the reservoir 37. The selector valves 43 and 44 are mounted in a valve block 45 (depicted by dotted line).

The first selector valve 43 has a supply port 46 which is connected to the pump 36 by a passage 47 in the valve block 45 and by line 48 and has a return port 49 which is connected to the reservoir 37 by passages 51, 52 in the valve block 45 and by line 53. The first selector valve 43 also has first and second control ports 54 and 55, the first control port 54 being connected to the first inlet/outlet port 41 of both actuators 33 and 35 through valve block passages 56, 57 and 72 and by lines 59 and 61 and the second control port 55 being connected to the second inlet/outlet port 42 of the actuators by valve block passages 62 and 63 and by lines 64 and 65. Similarly, the second selector valve 44 has a supply port 66 connected to the pump 36 by a passage 67 connected to valve block passage 47 and a return port 68 connected to the reservoir 37 by valve block passage 52. The second selector valve 44 also has a first control port 69 connected to the second inlet/outlet ports 42 of the hydraulic cylinders 33 and 35 by valve block passages 58, 62 and 63 and by lines 64 and 65. Similarly the second selector valve 44 also has a first control port 71 which is connected to the first inlet/outlet ports 41 of the hydraulic cylinders 33 and 35 by valve block passages 72, 57 and 56 and by lines 59 and 61. The selector valves 43. 44 are spring biased into an off condition in which direct flow between the ports 46, 49, 54, 55; 66, 68, 69, 71 of each selector valve is prevented.

A diverter valve 73 is in a passage 74 connecting passage 47 which takes the main flow of pressurised hydraulic fluid from the pump 36 and passage 52 which delivers the return flow to the tank 37. The diverter valve 73 acts as pressure modulating means as will be described later. A pressure transducer 75 is connected to the passage 47 by a passage 76 to provide a signal indicative of the pressure supplied by the pump 36.

The solenoid selector valves 43 and 44 and the diverter valve 73 are controlled by an electronic control unit (ECU) 77 which receives a pressure signal from the pressure transducer 75 and a lateral acceleration signal from an accelerometer 78. Signals indicative of other vehicle parameters may be included but these are not relevant to the present invention.

The selector valves 43 and 44 allow for four modes of operation. In the first mode (FIG. 4) the first selector valve 43 is on (solenoid energised) and the second selector valve 44 is off (solenoid de-energised). Hydraulic fluid under pressure can be supplied by the pump 36 to the first inlet/outlet ports 41 of the hydraulic rams 33, 35 through the first control port 54 of the first selector valve 43 and hydraulic fluid from the second inlet/outlet ports 42 of the rams 33, 35 can return to the reservoir 37 through the second control port 55 of the first selector valve. Hence hydraulic pressure supplied to the rams 33, 35 will tend to move each ram so that the respective actuating rod 39 is retracted into the cylinder and the ram can exert an effort in the form of a tensile force.

In the second mode (FIG. 5) the second selector valve 44 is on (solenoid energised) and the first selector valve 43 is off (solenoid de-energised). Hydraulic fluid under pressure can be supplied by the pump 36 to the second inlet/outlet ports 42 of the hydraulic rams 33, 35 through the second control port 69 of the second selector valve 44 and hydraulic fluid from the first inlet/outlet ports 41 of the rams 33, 35 can return to the reservoir 37 through the first control port 71 of the second selector valve. Hence hydraulic pressure supplied to the rams 33, 35 will tend to move each ram so that the respective actuating rod 39 is pushed out of the cylinder and the ram can exert a compressive force.

The first and second modes are the normal operating modes for when the vehicle is travelling on ordinary roads. When the vehicle is cornering, centrifugal force tends to cause the vehicle to lean outwards away from the corner. This moves one of the pivotal links 28, 31 upwards relative to the vehicle chassis 17 and the other link 31, 29 downwards relative to the chassis, such movement tending to twist the stabiliser bar assembly 23 by the crank arms 32 moving relative to the pivot arm assembly 29, compressing or extending the hydraulic rams 33 and 35. Such compression or extension is resisted by the hydraulic pressure supplied to the inlet/outlet ports 41, 42 in a manner which resists roll of the vehicle. This will be described in more detail later.

In the third mode of operation (FIGS. 1 and 6) both selector valves 43 and 44 are closed so that the hydraulic rams 33 and 35 are hydraulically locked. This is a fail-safe condition suitable for on road use which allows the stabiliser bar assembly 23 to act in the manner of a conventional stabiliser bar, the stabiliser bar 24 acting as a torsion bar to resist roll of the vehicle. There is a restricted flow path between the inlet/outlet ports 41, 42 of the rams 33, 35 which allows the front and rear suspension units 18, 19, 21 and 22 to restore the vehicle to an upright condition after cornering over a period of about 5 to 10 seconds, e.g. 7 seconds. In FIG. 1 the restricted flow path is illustrated by a passage in each piston 38. In practice, leakage flow past the seals of the pistons 38 can provide an appropriate flow path.

In the fourth mode (FIG. 7) both selector valves 43 and 44 are in the on (open) condition. The inlet/outlet ports 41 and 42 are interconnected which equalises the pressures on both sides of the ram pistons 38. The pump 36 is a positive displacement device which, being driven by the engine, has a limited delivery rate. Fluid can flow from the pump 36 through the selector valves 43 and 44 to the tank so no appreciable pressure is generated. The hydraulic rams 33 and 35 are free to extend and retract so that each stabiliser assembly 23, 34 is ineffective to resist roll, up to the limit of travel of the respective ram 33. This is an appropriate mode for extreme off-road conditions which require the axles 13 and 16 to articulate freely in opposite directions to optimise the ground contact pressure of the wheels 11, 12, 14, 15.

The diverter valve 73 is a pulse-width modulation solenoid-controlled flow valve and the pressure transducer 75 allows for closed loop control of pump delivery pressure in passage 47. Alternatively, open loop control can be used if the pump is calibrated and the pump delivery pressure is inferred from the engine speed and the mark/space ratio of the electrical current driving of the diverter valve 73.

Figure 8:
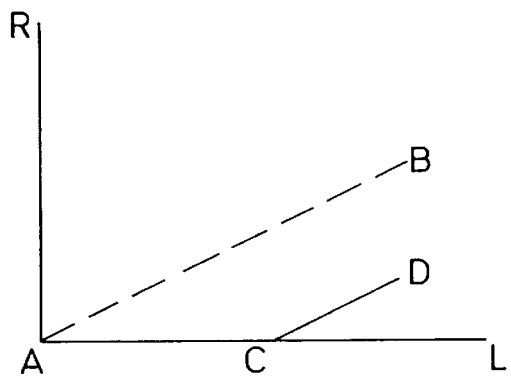
FIG. 8 is a graph showing vehicle roll angle plotted against vehicle lateral acceleration.

During normal use of the vehicle, the accelerometer 78 measures the centripetal (lateral) acceleration of the vehicle and the ECU 77 switches the selector valves 43 and 44 into the first or second mode according to cornering direction. At the same time, the ECU 77 operates the pressure modulating diverter valve 73 to adjust the pump pressure to a magnitude which will prevent vehicle roll at that particular acceleration. This provides an initial rate of increase of effort from the actuator rams 33, 35 which continues up to a pump pressure equivalent to a predetermined magnitude of lateral acceleration, e.g. 0.4 g. Thereafter, pump pressure continues to increase but at a reduced rate to allow a limited amount of body roll. This makes the driver more aware of the vehicle operating conditions, thereby discouraging cornering to the point where tire adhesion is lost. This is illustrated by FIG. 8 where roll angle R is shown as a function of lateral acceleration L and by FIG. 9 where the restoring torque T exerted by the roll stabilising system as a result of the actuator effort is shown as a function of lateral acceleration L. In FIG. 8 the horizontal line A-C shows roll control in operation at the initial rate of increase in actuator effort up to the predetermined magnitude of lateral acceleration at point C. Greater lateral acceleration results in controlled roll at the reduced rate of increase in actuator effort according to the characteristics C-D. The dashed line A-B illustrates the characteristics of a conventional vehicle in which roll increases with lateral acceleration under all normal conditions.

Figure 9:
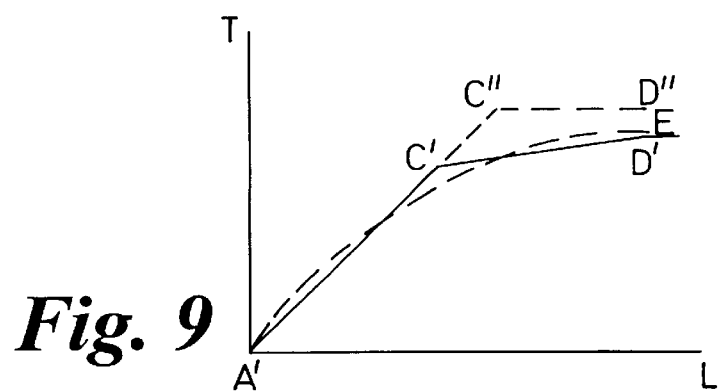
FIG. 9 is a graph showing the restoring torque exerted by the roll stabilising system plotted against vehicle lateral acceleration.

In FIG. 9 the steep straight line A'-C' shows the initial rate of increase in actuator effort and restoring torque up to the predetermined magnitude of lateral acceleration at point C'. Greater lateral acceleration results in controlled roll at the reduced rate of increase in actuator effort according to the characteristics C'-D', the reduced rate of increase in restoring torque being reflected by the reduced slope of this line. In a particular vehicle incorporating the invention, the line A'-C' represents 10,000 NM/g and line C'-D' represents 2,200 NM/g Beyond a second predetermined magnitude of lateral acceleration, e.g. 1.0 g the pressure may be held constant to allow a further increased rate of body roll. This can be achieved by the pressure modulating valve 73 in conjunction with the ECU 77 or by including a pressure relief valve in the hydraulic circuit.

As an alternative to increasing the actuator effort at a reduced rate when cornering beyond the predetermined magnitude of lateral acceleration, the pump pressure can be kept constant, i.e. the rate of increase reduces to zero. This is illustrated in FIG. 9 by the lines A'-C" and C"-D". In such a case, the predetermined magnitude of lateral acceleration may be higher, e.g. 0.5 g.

It will be appreciated that the ECU 77 can be programmed to produce any characteristic of actuator effort against lateral acceleration. So, for example, it may be beneficial to gradually reduce the rate of increase in actuator effort with lateral acceleration as implied by line A'-E in FIG. 9. Also, it may not be desirable to exactly counteract roll during the initial phase of roll control, i.e. some degree of roll may be required. Indeed, some degree of leaning-in (negative roll) may be desirable. The degree of control will be determined by the suspension and handling characteristics required of the particular vehicle model. Note also that the ECU 77 is also programmed to allow for different pressure/force characteristics of the rams 33 and 35 according to the direction of cornering, this being caused by the area of the actuating rods 39.

Although the selector valves 43, 44 are of simple design and construction, they may be hydraulically operated using solenoid or other electrically operated pilot valves. Also, other ways of modulating the pump pressure may be used, particularly if pump pressure is stored in an accumulator and is supplied to the selector valves through a pressure modulating valve which modulates supply pressure in direct proportion to electrical current.

Although the system has been described with stabiliser assemblies on both front and rear suspensions, it may be applied to only one of the front and rear suspension, albeit to the possible detriment of some of the operational advantages described. The invention is applicable to both conventionally sprung vehicles and to those utilising self-levelling, either both front and rear or front or rear only.

The invention may be used with other arrangements of stabiliser assembly to the one described above, for example one in which a stabiliser bar has two integral arms, one of which is linked to an unsprung part of the vehicle by the actuator, or one where the stabiliser bar is in two parts which are linked at or near the centre by the actuator. In fact, other ways of utilising the actuator to counteract roll are possible without using a stabiliser assembly with a stabiliser bar. Although a linear actuator has been shown, the invention is equally applicable where a rotary actuator is used.

What is claimed is:

1. A roll stabilizing system for a vehicle having a sprung part and an unsprung part, a suspension resiliently supporting the sprung part on the unsprung part so as to allow vehicle roll in response to lateral acceleration, the stabilizing system including an actuator operatively connected to the sprung and unsprung parts so that vehicle roll tends to cause displacement of the actuator, the actuator being operable in use to exert an effort in opposition to such displacement and so counteract the roll, the system further including electronic control means operatively connected to the actuator to control the actuator effort in response to the lateral acceleration wherein the actuator effort is arranged to increase in direct proportion to the lateral acceleration up to a predetermined magnitude of the lateral acceleration and increases in direct proportion to the lateral acceleration beyond said predetermined magnitude but at a reduced rate.

2. A roll stabilising system according to claim 1 wherein, up to said predetermined magnitude of lateral acceleration, the actuator effort is arranged to maintain the vehicle substantially level during cornering.

3. A roll stabilizing system according to claim 1 wherein the actuator effort remains constant when the lateral acceleration is increased beyond a second predetermined magnitude.

4. A roll stabilizing system according to claim 3 wherein said second predetermined magnitude of lateral acceleration is approximately 1.0 g.

5. A roll stabilising system according to claim 1 wherein said predetermined magnitude of lateral acceleration is in a range from 0.3 to 0.6 g.

6. A roll stabilising system according to claim 5 wherein said predetermined magnitude of lateral acceleration is approximately 0.4 g.

7. A roll stabilizing system according to claim 1 having front and rear wheels and further including a first actuator associated with the front wheels and a second actuator associated with the rear wheels.

8. A roll stabilising system according to claim 1 wherein the actuator comprises a double acting hydraulic device having first and second inlet/outlet ports, the roll stabilising system including a source of hydraulic fluid at a pressure, a drain, and valve means for controlling flow of hydraulic fluid from the source to the drain, the valve means being operable in a first mode in which the first inlet/outlet port is connected to the source and the second inlet/outlet port is connected to the drain and in a second mode in which the second inlet/outlet port is connected to the source and the first inlet/outlet port is connected to the drain, and pressure modulating means to modulate the pressure of the hydraulic fluid supplied by the source to the valve means and thereby control the actuator effort.

9. A roll stabilizing system according to claim 8 for a vehicle having front and rear wheels said actuator being associated with the front wheels and the system further comprising a second actuator associated with the rear wheels wherein said valve means is common to both actuators.

10. A roll stabilising system according to claim 8 wherein a flow rate of the hydraulic fluid supplied by the source is limited and the pressure modulating means comprises a diverter valve which diverts some of the hydraulic fluid supplied by the source to the drain.

11. A roll stabilising system according to claim 10 wherein the diverter valve comprises an electrically driven proportional valve having a driving electrical current which provides a restriction to hydraulic flow from the source to the drain, which restriction varies proportionally with the driving electrical current.

12. A roll stabilising system according to claim 8 wherein the valve means comprises first and second selector valves, each selector valve having a supply port for connection to the source, a return port for connection to the drain, a first control port connected to one of the inlet/outlet ports of the actuator and a second control port connected to the other of the inlet/outlet ports of the actuator, each selector valve having an off condition in which communication between the supply and drain ports and the control ports is prevented and an on condition in which, in the first selector valve, the supply port is connected to the first control port and the second control port is connected to the return port and, in the second selector valve, the supply port is connected to the second control port and the first control port is connected to the return port, the arrangement being such that, in a first mode, the first selector valve is in the on condition and the second selector valve is in the off condition and, in a second mode, the first selector valve is in the off condition and the second selector valve is in the on condition.

13. A roll stabilizing system according to claim 12 wherein there is a restricted flow path between the inlet/outlet ports of the actuator.

14. A roll stabilizing system according to claim 13 wherein the actuator includes an actuating piston and the flow path is through the piston.

15. A roll stabilising system according to claim 1 further comprising a stabiliser bar having two ends and being associated with the actuator to form a stabiliser assembly, the stabiliser assembly having connections adjacent each end of the stabiliser bar to connect the stabiliser assembly to adjacent sprung and unsprung portions of the vehicle and arranged so that roll of the vehicle causes the connections to move in a manner tending to twist the stabiliser assembly and the actuator effort acting to resist such twist.

16. A roll stabilising system for a vehicle having a sprung part and an unsprung part, a suspension resiliently supporting the sprung part on the unsprung part so as to allow vehicle roll in response to lateral acceleration, the stablising system including an actuator operatively connected to the sprung and unsprung parts so that vehicle roll tends to cause displacement of the actuator, the actuator comprising a double acting hydraulic device having first and second inlet/outlet ports and being operable in use to exert an effort in opposition to such displacement and so counteract the roll, wherein the system further includes a source of hydraulic pressure and a drain and valve means for controlling flow of hydraulic fluid from the source to the drain, the valve means being operable in a first mode in which the first inlet/outlet port is connected to the source and the second inlet/outlet port is connected to the drain and in a second mode in which the second inlet/outlet port is connected to the source and the first inlet/outlet port is connected to the drain, and pressure modulating means to modulate the pressure of the hydraulic fluid supplied by the source to the valve means and thereby control the actuator effort, the valve means comprising first and second selector valves each having a supply port for connection to the source, a return port for connecting to the drain, a first control port connected to one of the inlet/outlet ports of the actuator and a second control port connected to the other of the inlet/outlet ports of the actuator, each selector valve having an off condition in which communication between the supply and drain ports and the control ports is prevented and an on condition in which, in the first selector valve, the supply port is connected to the first control port and the second control port is connected to the return port and, in the second selector valve, the supply port is connected to the second control port and the first control port is connected to the return port, the arrangement being operable in first, second, third and fourth modes such that in the first mode the first selector valve is in the on condition and the second selector valve is in the off condition, in the second mode the first selector valve is in the off condition and the second selector valve is in the on condition in the third mode the inlet/outlet ports are blocked and both selector valves are in the off condition, and in the fourth mode the inlet/outlet ports are interconnected and both selector valves are in the on condition.

17. A roll stabilising system according to 16 wherein each selector valve is spring biased into the off condition.

* * * * *

Disclaimer 6,179,310—David Andrew Clare, Wellesbourne; Phillip James Green, Nuneaton; William Burdock, Sutton Coldfield; Mark Pask, Bromgrove, all of Great Britian. VEHICLE ROLL STABILIZING SYSTEM. Patent dated January 30, 2001. Disclaimer filed August 13, 2001, by the assignee, Rover Group Limited.

Hereby enters this disclaimer to claims 16 and 17 of said patent.
*(Official Gazette, November 13, 2001)*